United States Patent

Peter et al.

[11] Patent Number: 5,844,043
[45] Date of Patent: Dec. 1, 1998

[54] CROSSLINKABLE MIXTURES OF RECYCLED RUBBER GRANULES AND RUBBER

[75] Inventors: Julius Peter, Vienna, Austria; Peter Schmidt, Waldkraiburg, Germany; Dieter Mahlke, Marl, Germany; Klaus zur Nedden, Haltern, Germany

[73] Assignee: Huels Aktiengesellschaft, Marl, Germany

[21] Appl. No.: 411,845

[22] Filed: Mar. 28, 1995

Related U.S. Application Data

[63] Continuation of Ser. No. 200,310, Feb. 23, 1994, abandoned, which is a continuation of Ser. No. 859,870, Mar. 30, 1992, abandoned.

[30] Foreign Application Priority Data

Apr. 6, 1991 [DE] Germany ............... 41 11 158.3

[51] Int. Cl.$^6$ ..................................... C08J 11/04
[52] U.S. Cl. ............... 525/191; 526/72; 526/308; 525/192; 525/240
[58] Field of Search ................. 525/192, 191, 525/240; 526/72, 308

[56] References Cited

U.S. PATENT DOCUMENTS

| | | | |
|---|---|---|---|
| 2,378,717 | 7/1945 | Maley ......................... | 525/521 |
| 3,281,389 | 10/1966 | Hirshfield et al. . | |
| 3,489,710 | 1/1970 | Bonotto et al. . | |
| 3,726,944 | 4/1973 | Bennet et al. . | |
| 3,816,358 | 6/1974 | Nordsiek et al. ............... | 525/240 |
| 3,821,328 | 6/1974 | Streck et al. ............... | 525/195 |
| 3,904,470 | 9/1975 | Fukuki et al. ............... | 525/237 |
| 3,931,357 | 1/1976 | Meyer et al. ............... | 525/195 |
| 4,052,344 | 10/1977 | Crane et al. ............... | 526/20 |
| 4,101,463 | 7/1978 | Morgan et al. ............... | 526/20 |
| 4,125,578 | 11/1978 | Sear . | |
| 4,153,772 | 5/1979 | Schwesig et al. ............... | 525/240 |
| 4,183,876 | 1/1980 | Coran et al. ............... | 525/232 |
| 4,244,841 | 1/1981 | Frankland . | |
| 4,257,925 | 3/1981 | Freeguard . | |
| 4,304,885 | 12/1981 | Omori et al. . | |
| 4,481,335 | 11/1984 | Stark, Jr. ............... | 525/261 |
| 5,114,648 | 5/1992 | Kuc, Sr. ............... | 264/134 |
| 5,157,082 | 10/1992 | Johnson ............... | 525/237 |

OTHER PUBLICATIONS

Holtrup et al., "Polyoctenamel an Elastomer with a New Molecular Structure" Light Bogen, v.23(1974), pp. 16–17, 1974.

Encylcopedia of Polymer Science & Engineering; Polyoctenamers, vol. 11, pp. 287–314 (1988).

Nordsiek, "Vullanizable Compositions" (1973) Laplus #1973:112539.

Schwesig, "Vallanizable Molding Compositions" (1976) Laplus #1976:407063.

Holtrup, "Polyoctenamer" (1974) Laplus #1977:91401.

*Primary Examiner*—Cecilia J. Tsang
*Assistant Examiner*—Patrick R. Delaney
*Attorney, Agent, or Firm*—Oblon, Spivak, McClelland, Maier & Neustadt, P.C.

[57] ABSTRACT

Crosslinkable mixtures are made of recycled rubber granules, rubber and oil. The crosslinkable mixtures are made of recycled rubber granules mixed with rubber dissolved in oil. The crosslinkable mixtures can be press molded into molded bodies having good mechanical and elastic properties, since a virtually plastic flowing provides for optional bonding of the granule particles among each other during processing.

12 Claims, No Drawings

CROSSLINKABLE MIXTURES OF RECYCLED RUBBER GRANULES AND RUBBER

This application is a Continuation of application Ser. No. 08/200,310, filed Feb. 23, 1994, now abandoned, a Continuation of application Ser. No. 07/859,870 filed Mar. 30, 1992, now abandoned.

BACKGROUND OF THE INVENTION

1. Field of the Invention

The invention relates to crosslinkable mixtures, which contain recycled rubber granules and rubber as well as conventional auxiliaries, to a process for manufacture and to uses of the mixtures.

2. Discussion of the Background

It is known to recycle for reuse scrap rubber from used objects such as vehicle tires and from scraps of the rubber processing industry. In so doing, three different methods are generally used.

First, scrap rubber can be partially depolymerized thermally or mechanically, eventually by adding chemicals (reclaiming). The disintegrated plastic compounds (regenerate) obtained yield, after renewed processing, only products with poor mechanical and elastic properties.

Further, scrap rubber can be pyrolyzed, where the thermal treatment is conducted under extreme conditions and with the exclusion of oxygen. This leads to simultaneous formation of solid, liquid, and gaseous materials, a state that is not advantageous for a complete recycling of the scrap rubber into the production cycle. In addition, both methods have the drawback that they are energy intensive and thus expensive.

The third frequently used method is the processing of scrap rubber into recycled rubber granules, which serve in small quantities as a feedstock during the manufacture of rubber products. The pure recycled rubber granules can also be press-molded again, but owing to the inadequate flow characteristics only products of low value and poor properties are obtained.

There have been many attempts to mix recycled rubber granules with thermoplastic polymers. Such mixtures can then (optionally following extrusion and granulation) be processed through compression molding into new products. However, such mixtures are relatively nonhomogeneous and exhibit poor flow properties during press molding. Therefore, the mechanical and elastic properties of the products manufactured therefrom are not suitable for most fields of application.

Due to these drawbacks, the ecologically safe and effective, as well as economical recycling of scrap rubber has been conducted on only a small scale. In particular, the huge quantities of non-reutilized old tires represent a significant environmental problem.

SUMMARY OF THE INVENTION

Accordingly, one object of the present invention is to provide crosslinkable mixtures based on recycled rubber granules.

These and other objects which will become apparent from the following specification have been achieved by the present invention including a crosslinkable mixture containing recycled rubber granules and a rubber dissolved in oil as well as a method of manufacturing the same.

DETAILED DESCRIPTION OF THE PREFERRED EMBODIMENTS

In the present invention, recycled rubber granules are mixed with a solution of a vulcanizable rubber which is dissolved in an oil. The recycled rubber granules are intimately mixed and coated with the dissolved rubber/oil mixture. The result is a free-flowing granular composition which can be easily press-molded into molded bodies having good mechanical and elastic properties.

Both crosslinked materials based on all purpose elastomers such as synthetic and natural cis-1,4-polyisoprene (NR), isobutylene-isoprene-rubber (IIR), styrene-butadiene-rubber (SBR), polybutadiene (BR) and ethylene-propylene-(dienes)-rubbers (diene is, e.g., 2-ethylidene norbornene) and also vulcanizates based on special elastomers such as chlorobutadiene-(CR) or acrylonitrile-butadiene-rubbers may be used as the recycled rubber granules in the present process.

The recycled rubber granules may comprise scraps, which accumulate during production processes, such as during profile finishing. On the other hand, following suitable processing the granules can also be manufactured from used rubber objects such as tires.

The recycled rubber granules may be manufactured in a known industrial manner, e.g., in pelletizers by grinding on roll mills or by grinding frozen rubber parts in hammer mills (see, e.g., W. Becker, D. Braun (ed.) in Kunststoffhandbuch, vol. 1, Die Kunststoff, Hanser-Verlag, Munich 1990, page 300 ff.).

The diameter of the recycled rubber granules will generally range between about 0.1 and 10 millimeters. Preferably, however, a granule with a particle size ranging from 0.5 to 4 millimeters is used. However, it is also possible to use granules with larger diameters.

In principle, rubbers such as BR, EPDM, IR, IIR, NR and polyoctenamers are soluble in oil. Any oil which is capable of dissolving a rubber such as those noted above at a temperature below the decomposition temperature of the rubber may be used in the present process to form the rubber/oil solution. Suitable oils include, but are not limited to, mineral oils and synthetic plasticizer oils. Depending on the application, mixtures of oils are also suitable. The rate of dissolution and the solubility itself vary widely, depending on the type of rubber, molecular weight, degree of long chain branching of the polymers, etc. Suitable oils may contain aromatic as well as aliphatic or paraffinic components and should be stable to vulcanization conditions. Vulcanization is generally conducted at temperatures from about 150°–250° C., and accordingly, the oil should be both thermally and chemically stable throughout this temperature range. Suitable oils are well known in the art and available commercially.

A preferred embodiment of the invention is the use of trans-polyoctenamers (TOR) dissolved in a paraffinic oil, since they dissolve well and rapidly in oil at temperatures above 60° C., owing to their thermoplasticity which is unusual for a rubber.

The preferred polyoctenamers are manufactured according to known methods, i.e., reaction products obtained from cyclooctene with the aid of metathesis catalysts. These catalysts contain known compounds of metals of the 5th to 7th transition metal groups of the Periodic Table of Elements, primarily niobium, tantalum, molybdenum, tungsten, and rhenium and metals of the 1st to 4th main groups or their alkyls or hydrides, optionally with other ligands such as halogen, alkoxyl or carboxylate, or in their place Lewis acids. In addition, other activating additives such as alcohols, epoxides, hydroperoxides, vinyl- and allyl ethers and -esters, vinyl halides and aromatic nitro compounds can be a component of the catalyst system.

The polymerization can be effected in all solvents that are known as being suitable during polymerization with the aid of Ziegler-Natta catalysts. The most important representatives from the group of aliphatic, alicyclic, aromatic, and halogenated hydrocarbons are the following: pentane, hexane, heptane, n- and iso-octane, isononane (hydrogenated trimer of propene), n-decane, isododecane (hydrogenated tetramer of propene), cyclopentane, cyclohexane, methyl cyclopentane, methyl cyclohexane, ethyl cyclohexane, isopropyl cyclohexane, cyclooctane, decahydronaphthalene, hydrogenated terpenes such as pinane and camphane, cyclohexene and its substituent products, benzene, toluene, o-, m-, p-xylene, ethylbenzene, o-, m-, p-diethylbenzene, n-propylbenzene, isopropylbenzene, and other mono- to polyalkylbenzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (isomer mixtures), bromobenzene, fluorobenzene, and 1,2-dichloroethane.

It is important that the solvent be as free as possible of water and other H-acidic compounds and compounds with electron donor functional groups (Lewis bases). Except for very small quantities, which are added optionally to achieve specific effects, such impurities have generally a negative impact on the activity of the catalyst. The solvent can be purified by known methods.

The customary polymerization temperature ranges from −50° to +80° C. It is limited at the top by the thermal stability of the catalyst and at the bottom by a very reduced reaction speed. It is advantageous to work at temperatures ranging from −30 to +60° C., preferably, however, in a range between 0 and +50° C., which can be realized quite easily.

The molecular weights of the polyoctenamers can be set within a wide range by adding open chain olefins, also functionally substituted at will (see DE-OS 29 22 335 and DE-PSS 19 19 047, 19 45 358, 20 27 905, 20 28 935, 21 05 161 and 21 57 405).

The quantity of controller that is necessary to achieve a specific consistency depends naturally on the kind of controller, the catalyst used and the other polymerization conditions, the required quantity, which can amount to 50 mole percent, based on the monomer added, can be readily determined by a few preliminary tests. When the desired or achievable conversion has been attained, the catalyst is deactivated by adding an alcohol such as methanol or another H-acidic compound.

In general, polyoctenamers with a molecular weight (Mw=weight average of the molecular weight) up to 200,000, preferably between 20,000 and 150,000 are added. The trans content ranges from 50 to 90%, preferably from 55 to 85%. The solution viscosity (J value determined in toluene at 25° C. and a concentration of 0.005 $g/cm^3$) of the polyoctenamers ranges from 80 to 200 ml/g, preferably from 100 to 150 ml/g.

To manufacture the rubber component dissolved in oil according to the invention, the procedure is generally as follows. In a suitable container with stirring device the oil (mineral oil) is heated to a temperature ranging from 80 to 100° C. Then the rubber is added in the form of granules and stirred until it has dissolved completely. The stirring time to dissolve the trans-polyoctenamers is advantageously short and ranges from 15 to 60 minutes, depending on the proportion of oil to rubber.

Mixtures of mineral oils and rubber (trans-polyoctenamers) in a ratio starting at 95 parts by weight to 5 parts by weight and ending at 60 parts by weight to 40 parts by weight are used preferably to manufacture the crosslinkable mixtures of the invention. Especially preferred are mixtures with 90 to 75 parts by weight of oil and 10 to 25 parts by weight of rubber.

The rubber component dissolved in oil and manufactured in this manner is then mixed with the recycled rubber granules. The mixing is done, for example, in a blade mixer and is primarily dependent on the nature and kind of the recycled rubber granules.

Preferably a fluid mixer (e.g., of the Diosna or Henschel Company) is used to manufacture the crosslinkable mixtures according to the invention. The two components are added at a temperature ranging from 10° to 80° C. In this manner an excellent wetting (coating) of the individual rubber granules is produced within a short period of time; the average duration of blending is about 5 minutes.

Following the termination of the mixing process, free-flowing granules are obtained. Depending on the application, these granules contain, in addition to the different recycled rubber granules, 3 to 35 parts by weight of rubber dissolved in oil, based on 100 parts by weight of the recycled rubber granules. The quantity of rubber that is used ranges from 0.5 to 20 parts by weight, based on 100 parts by weight of the recycled rubber granules.

Depending on the application, the crosslinkable mixtures according to the invention may contain other fillers and auxiliaries known in rubber technology such as carbon black (e.g., N 330, N 550, N 762) and mineral substances (e.g., highly active silicic acid, kaolin, chalk), flame retardants (e.g., aluminum or magnesium hydroxide) and crosslinking agents in conventional amounts.

The crosslinking is conducted with conventional crosslinking systems on the basis of sulfur, sulfur donors, and vulcanization accelerators and with vulcanizing resins (e.g., on the basis of resorcinol-formaldehyde) or peroxides. The quantities are such that adequate crosslinkage and thus optimal mechanical and elastic properties oriented towards the application are obtained.

Of course, even the use of uncrosslinked synthetic and natural rubber is also possible as an additive to the crosslinkable mixtures of the invention.

The crosslinkable mixtures of the invention can be manufactured rapidly and without a great deal of energy. They can be press molded excellently into molded bodies, since a largely plastic flowing during processing provides for an optimal bonding of the recycled rubber particles among each other. Thus, the vulcanizates of the molded bodies manufactured have good mechanical and elastic properties.

The crosslinkable mixtures of the invention can be used, e.g., to manufacture floor coverings and extrudates.

Other features of the invention will become apparent in the course of the following descriptions of exemplary embodiments which are given for illustration of the invention and are not intended to be limiting thereof.

EXAMPLES

In the following examples, superscripts having the following meanings are used:

1) VESTENAMER® 8012, trans content approximately 80%, Hüls AG, Germany
2) paraffinic mineral oil, TUDALEN® 8013, Dahleke, Ahrensburg, Germany
3) CBS: benzothiazyl-2-cyclohexylsulfenoxide, VULKACIT® CZ, Bayer AG, Germany.

Example 1

In a 10 liter fluid mixer of the Diosna Company, 100 g of EPDM rubber granules (particle size 0.5 to 1.5 mm), 10 g of a mixture, comprising 20 parts by weight of trans-polyoctenamer and 80 parts by weight of oil (see Table 1) and heated to 80 to 100° C., 0.15 g of sulfur and 0.15 g of accelerator were mixed at room temperature for 3 minutes at a speed of 500 rpm.

The free-flowing granules that were obtained were filled into a platen compression mold and vulcanized for 20 minutes at 180° C. and at a molding pressure ranging from 7 to 14 bar/cm². Mechanical data such as tensile strength, elongation at break and modulus were determined on a standard test piece ST in accordance with DIN 53 504 and the compression set in accordance with DIN 53 517.

TABLE 1

| | | |
|---|---|---|
| ground recycled granules basic rubber EPDM particle size 0.5 to 1.5 mm | 100 parts by weight | |
| trans-polyoctenamer[1]/mineral oil mixture[2] 20:80 | 10 parts by weight | |
| sulfur | 0.15 parts by weight | |
| accelerator CBS[3] | 0.15 parts by weight | |
| After vulcanization for 20 min/180° C. | | |
| tensile strength | MPa | 2.7 |
| elongation at break | % | 598 |
| modulus At 100% elongation | MPa | 1.1 |
| compression set | | |
| 70 hours/23° C. | % | 35 |
| 24 hours/70° C. | % | 33 |
| After hot air ageing 7 days/100° C. | | |
| tensile strength | MPa | 2.5 |
| elongation at break | % | 406 |

Examples 2 to 5

Other rubber mixtures and vulcanizates were manufactured and tested with different parameters (quantity in parts by weight and kinds of additives; see Table 2) according to the same procedure and in the same equipment as specified in example 1.

TABLE 2

| | 2 | 3 | 4 | 5 |
|---|---|---|---|---|
| EPDM-based granules (particle size 1–4 mm) | 100 | — | 100 | 100 |
| NR-based granules (particle size 0.2–0.5 mm) | — | 100 | — | — |
| trans-polyoctenamer[1]/mineral oil mixture[2] 20:80 | 10 | 10 | 5 | 30 |
| sulfur | 0.15 | 0.15 | 0.08 | 0.45 |
| accelerator CBS[3] | 0.15 | 0.15 | 0.08 | 0.45 |
| After vulcanization for 20 min/180° C | | | | |
| tensile strength MPa | 2.7 | 3.3 | 2.2 | 2.1 |
| elongation at break % | 671 | 271 | 438 | 814 |
| modulus MPa | 1.0 | 1.5 | 1.3 | 0.5 |
| At 100% elongation compression set | | | | |
| 70 hours/23° C. % | 36 | 22 | 39 | 35 |
| 24 hours/70° C. % | 31 | 35 | 37 | 29 |

Example 6

In a fluid mixer free-flowing granules (see Table 3 for additives and quantities in parts by weight) were manufactured by the same procedure as in example 1. These granules were filled into an automatic injection molding machine of the Battenfeld Company, plasticized at 70° C., and injected into a cup mold within 10 seconds. Following a vulcanization period of 3 minutes at 200° C. (compression pressure 7–14 bar/cm²), the mechanical properties were determined on the standard test piece S II in accordance with DIN 53 504.

TABLE 3

| | |
|---|---|
| SBR-based granules (particle size <1 mm) | 100 |
| trans-polyoctenamer[1]/mineral oil mixture[2] 20:80 | 30 |
| ZnO RS | 3 |
| stearic acid | 1 |
| sulfur | 1.5 |
| accelerator CBS[3] | 1.5 |
| Test on a finished piece (S II rod from a plaster mold) | |
| tensile strength MPa | 4.0 |
| elongation at break % | 207 |
| modulus at 100% elongation MPa | 1.5 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A free-flowing granular crosslinkable rubber composition, consisting essentially of:

100 parts by weight of vulcanized rubber granules intimately mixed and coated with 3–35 parts by weight of a solution of unvulcanized polyoctenamer dissolved in oil capable of dissolving said unvulcanized polyoctenamer, wherein the ratio of oil to unvulcanized polyoctenamer is 95:5 parts by weight to 60:40 parts by weight, at a temperature below the decomposition temperature of the unvulcanized polyoctenamer, and an effective amount of a vulcanizing agent.

2. The mixture of claim 1, wherein said vulcanized rubber is selected from the group consisting of BR, EP(D)M, IR, IIR, NR, SBR, CR, polyoctenamer and acrylonitrile-butadiene rubbers.

3. The mixture of claim 2, wherein said rubber granules have a size in the range of about 0.1–10 mm.

4. The mixture of claim 3, wherein said rubber granules have a size in the range from 0.5–4 mm.

5. The mixture of claim 4, wherein said oil is a mineral oil or a plasticizer oil.

6. The mixture of claim 5 wherein said oil is an aromatic oil, aliphatic oil or paraffinic oil which is thermally and chemically stable at temperatures from about 150°–250° C.

7. The mixture of claim 6, wherein said oil is a paraffinic oil.

8. The mixture of claim 7, wherein the ratio of oil to unvulcanized polyoctenamer is 90:10 to 75:25 parts by weight.

9. The mixture of claim 8, wherein the amount of unvulcanized polyoctenamer is 0.5–20 parts by weight based on 100 parts by weight of said vulcanized rubber granules.

10. The mixture of claim 9, wherein said vulcanizing agent is sulfur, sulfur donors and mixtures of sulfur and a vulcanization accelerator.

11. The mixture of claim 10, wherein said vulcanizing agent is sulfur and a vulcanization accelerator.

12. A free-flowing granular crosslinkable rubber composition, consisting essentially of: 100 parts by weight of vulcanized rubber granules mixed with an effective amount of sulfur and vulcanization accelerator, and 3–35 parts by weight of a solution of an unvulcanized polyoctenamer dissolved in a paraffinic oil, wherein said mixture contains 95:5 parts by weight of oil to 60:40 parts by weight of unvulcanized polyoctenamer wherein said oil is capable of dissolving the polyoctenamer and is thermally and chemically stable at temperatures of about 150°–250° C., and wherein said vulcanized rubber is intimately mixed and coated with said unvulcanized polyoctenamer dissolved in oil.

* * * * *